Sept. 8, 1970 R. TAESLER 3,527,529

MOTION PICTURE CAMERA WITH SYNCHRO-IMPULSE TRANSMITTER

Filed Jan. 18, 1968

United States Patent Office 3,527,529
Patented Sept. 8, 1970

3,527,529
MOTION PICTURE CAMERA WITH SYNCHRO-IMPULSE TRANSMITTER

Rudolf Taesler, Stuttgart, Germany, assignor to Zeiss Ikon Aktiengesellschaft, Stuttgart, Germany, a corporation of Germany
Filed Jan. 18, 1968, Ser. No. 698,946
Claims priority, application Germany, Jan. 28, 1967, Z 12,680
Int. Cl. G03b *31/00*
U.S. Cl. 352—19 5 Claims

ABSTRACT OF THE DISCLOSURE

A motion picture camera with a synchro-impulse transmitter forming a part of a device for recording a pilot sound track on a sound carrier which is separated from the picture film. Structure is provided for stopping the picture film advancing mechanism while the synchro-impulse transmitter continues to operate so that a desired pause in picture taking can be recorded in the form of an additional impulse track on the separate sound carrier. This permits an easy determination of the places where the picture film is to be cut for the insertion of intermediate picture scenes.

The invention relates to a motion picture camera provided with a synchro-impulse transmiter which is part of a device for recording a pilot sound track on a sound carrier separated from the film.

Known cameras of this type collaborate with devices for recording a pilot sound track in the following manner:

The synchro-impulse transmitter in the camera transmits during picture taking a succession of impulses to an impulse recording head for recording these impulses on a sound tape. At the same time, another track of this sound tape receives the recordings of a sequence of sounds, such as music, spoken word or the like.

At a later simultaneous playing of the sound tape and projecting of the film, the synchronizing impulses recorded on the sound tape are effective for producing a lip-synchronized picture-tone reproduction. For a satisfactory control of the projector equipment for this kind of reproduction, a continuous succession of synchronizing impulses is required and if only one impulse is missing, the projector will stop.

Difficulties will arise if, for instance, a concert or a speech is to be recorded in full, but the motion pictures are desired to be made interesting by making certain cuts. However, as soon as the picture shooting is interrupted, the sound tape will no longer receive the necessary synchronizing impulses. The gaps so produced will have to be closed at the later cutting of the film and the scene length of the individual intermediate cuts has to be found. This is complicated and tedious because the original tone sequence must not be changed, that is, it must not be cut.

It is the object of the invention to overcome this difficulty by providing a device which cooperates with the device for recording the pilot sound track on the separate sound carrier and makes a satisfactory synchronized projection possible without much previous effort when cutting the film and closing impulse gaps.

According to the invention, the motion picture camera including the synchro-impulse transmitter is provided with a device by means of which the film advance may be stopped while the synchro-impulse transmitter keeps operating. This furnishes the desired pause in picture taking which later on the film strip is to be filled by intermediate cuttings. The synchro-impulse transmitter, however, permits a further gap-less, complete recording of the synchronizing impulses At the later cutting of the film all that is needed is to fill the gaps between the lip synchronous scenes by the intermediate cut scenes. The sound tape remains untouched and has throughout the necessary succession of synchronizing impulses.

The device according to the invention may consist of a slide plate, a lever, a bolt or a similar structural element which in relation to its position permits or prevents the entrance of the film transport gripper into the film perforations.

In further developing the inventive concept, the named device may be connected with the impulse recording head of the device for recording the pilot sound track in such manner that, when the film advance is turned off, the inventive device so directs the impulse recording head without interrupting the synchronizing impulse sequence that it records the impulses additionally on a second track.

In this manner a continuous impulse sequence is produced from the beginning to the end of a sound recording. Parallel thereto are recorded impulse sequences which correspond each to the length of an intermediary cut scene. When cutting the film, the tape recorder and the projector are first turned on synchronously until the first change of scene is recognized, which is readily visible on the picture film. At this place the film is cut and the desired intermediate scene is spliced in. Thereupon the section of the film with the splice in it is once again synchronously passed through the tape recorder and the projector, and shortly after the visible change to the spliced-in scene the synchronizing impulse head on the tape recorder is switched from the track with the continuous impulse sequence to the second impulse track. The projector, meanwhile, keeps operating without interruption until the end of the second impulse track is reached. It stops as soon as no further impulses arrive. This spot is marked by some known device in the projector and the scene is cut off. After the previously cut off film section with the lip-synchronous pictures thereon is rejoined to the film strip, the film may be projected without interruption from the beginning over the first spliced-in scene to the second lip-synchronus portion. Upon arriving at the next change of scene, the above outlined procedure is repeated and so on until the film with all intermediary cut scenes is completed.

The mentioned connection of the inventive device with the impulse recording head may according to the invention be brought about by a switch which is kept closed by the inventive device—for instance a structural element for preventing the gripper from entering into the film perforations—as long as the film is stopped by it. During this time the switch additionally activates part of the impuse recording head which records on a second track the impulses that keep coming in in a continuous sequence.

In order to prevent a permanent exposure of a section of the film when using the device according to the invention, this device may be coupled with a shutter disk which covers the picture window as long as the film is not advanced while the synchro-impulse transmitter keeps operating.

These and other objects of the invention will be described in greater detail in the following with reference to the accompanying drawings. Details not essential to the invention have been omitted from the drawings for the sake of greater clarity.

Figure 1:
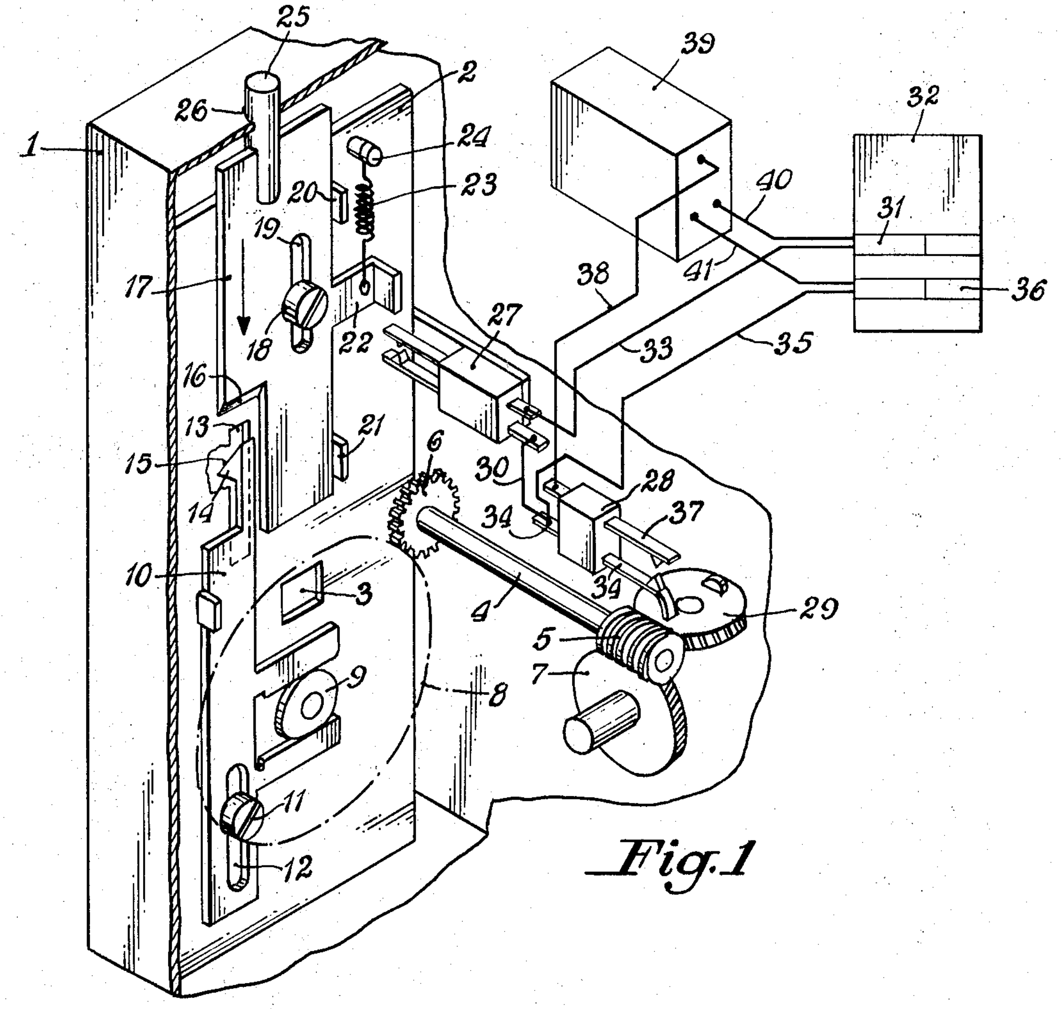
Fig.1 Prior Art
FIG. 1 illustrates a simplified perspective view of a motion picture camera according to the invention, including the parts of the device for recording a pilot sound track on a sound carrier separated from the film.

Referring to FIG. 1, the camera 1 is provided with a film guide plate 2 having a picture window 3, and with other parts, such as a shaft 4, a worm 5, a gear wheel 6, a worm gear 7 and a rotary diaphragm shutter 8 of a camera drive mechanism. Connected with the rotary diaphragm shutter 8 is a control cam 9 for a film transport gripper 10. The film transport gripper 10 is supported by the film guide plate 2 and is held thereon by a shoulder screw 11 which projects through a longitudinal slit 12 in the film transport gripper 10. The necessary supplementary guidance of the gripper is furnished, by a gripper tooth 14 projecting through a longitudinal slit 13 in the film guide plate 2. An inclined surface 15 on the film transport gripper 10 serves as a starting surface for a corresponding inclined surface 16 on a slide plate 17. The slide plate 17 is also supported by the film guide plate 2 and is held and guided by a shoulder screw 18 projecting through its longitudinal slits 19 and is additionally guided by rectangular tongues 20 and 21 provided on the film guide plate 2. An angularly bent off extension 22 on the slide plate 17 serves as a point of attachment for one end of a spring 23 which seeks to pull the slide plate 17 upwardly. The other end of the spring 23 is attached to a pin 24 on the film guide plate 2. Finally, the slide plate 17 is provided with an operating handle in the form of a pressure bolt 25. This pressure bolt 25 projects outwardly through an opening 26 in the top wall of the casing of the camera 1.

In the range of motion in the angularly bent off portion of the extension 22 is disposed in the camera a switch 27 which is connected by a conductor 30 with a switch 28 of a contact transmitter 29 and by another conductor 33 with the recording range 31 of an impulse recording head 32. From the contact spring 34 of the switch 28, to which the conductor 30 is connected, another electric conductor 35 leads to another recording range 36 of the impulse recording head 32. A second contact spring 37 of the switch 28 is connected by means of an electric conductor 38 to a tone generator 39 which preferably produces an oscillation of 1000 hertz. Two electric conductors 40 and 41 lead from the tone generator 39 each to a recording range (head portion) 31, 36 of the impulse recording head 32.

Figure 2:
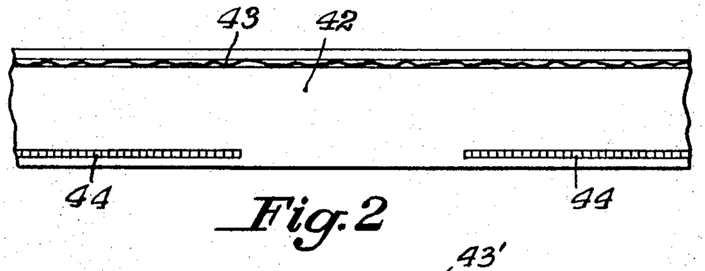
FIG. 2 illustrates a top view of a sound tape with a sound track thereon and an interrupted synchronizing impulse track according to a prior art method.

The sound tape 42 illustrated in FIG. 2 shows a continuous sound track 43 and a discontinuous synchronizing impulse track 44. A sound tape of this kind is produced during the picture-tone recording with prior art camera equipment.

Figure 3:
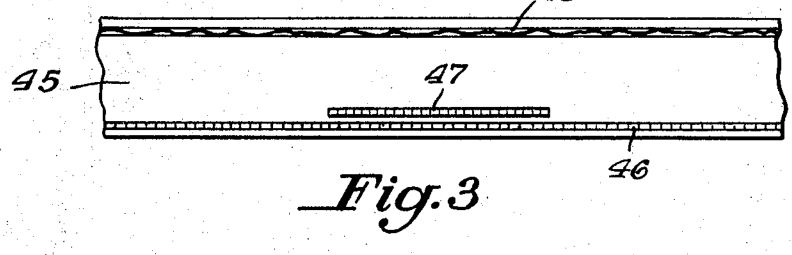
FIG. 3 illustrates a top view of a sound tape with a sound track thereon and with a continuous and a second discontinuous synchronizing impulse track according to the invention.

FIG. 3 illustrates a sound tape 45 having thereon a continuous sound track 43', a continuous synchronizing impulse track 46 and a discontinuous second synchronizing impulse track 47.

For the recording of a concert or a speech or anything else where the sound sequence must not be interrupted, but where cuts of the picture portion are made, the tape recorder and the camera are permitted to start operating in parallel. The impulses transmitted by the contact transmitter 29 are recorded as synchronizing impulses on the track 46.

If the picture sequence is to be interrupted for a cut, the pressure bolt 25 is depressed. The slide plate 17 moves downward against the action of the spring 23. Its inclined surface 16 engages the included surface 15 of the film transport gripper 10 and raises the gripper 10 such a distance that its gripper tooth 14 is no longer able to engage the film perforations. At the same time, the exposure light beam may be covered by a shutter diaphragm not illustrated. The film no longer advances, i.e. the picture sequence is stopped. The camera drive mechanism, however, continues operating and moves the contact transmitter 29, the cam of which also continues to operate and rhythmically closes the contact between the contact springs 34 and 37. The synchronizing impulses are recorded on the track 46 by the recording portion 36 by way of the electric conductors 35, 38 and 41 and the tone generator 39. Simultaneously with the raising of the film transport gripper 10, the slide plate 17 with its extension 22 has closed the switch 27. The synchronizing impulses triggered by the contact transmitter 29 therefore are by way of the electric conductors 30, 33, 38 and 40 and the tone generator 39 also transmitted to the recording range 31 which records these impulses on the track 47 as long as the pressure bolt 25 and the camera release remain depressed. When the pressure bolt 25 and therewith the slide plate 17 is released, the gripper resumes operating and the recording of impulses on the second track 47 ceases.

In this manner the length of the cut scene to be used later is accurately determined. The sequence of impulses, which is necessary for a later troublefree operation of the projector, is not interrupted. The additional impulse track 47 serves, as already mentioned, only for facilitating the processing of the film. Its recording and the interruption of the picture sequence connected therewith for a later splicing-in of scenes may be repeated as often as desired.

How the cutting is done for the intermediary scenes to be spliced into the film strip has already been described in an earlier portion of the description.

If in known manner the camera release button and the pressure bolt 25 for operating the device of the invention are so constructed that they can be locked in their operative position, then the film in the camera may even be changed without interrupting the recording of synchronizing impulses.

What I claim is:

1. A motion picture camera, including a picture film advancing mechanism, a synchro-impulse transmitter forming a part of a device for recording a pilot sound track on a sound carrier which is separated from the picture film in said camera, a camera drive mechanism provided with a gear for driving said film advancing mechanism and said synchro-impulse transmitter, and means in said camera for stopping said film advancing mechanism while keeping said gear and said synchro-impulse transmitter (29) operating.

2. A camera according to claim 1, including a device for recording a pilot sound track provided with an impulse recording head (32), means for connecting said means (10, 17) for stopping said film advancing mechanism with said impulse recording head so that when the film advance is stopped, it causes said impulse recording head without interrupting the sequence of synchronizing impulses to record said impulses additionally on a second track (47) of said sound carrier.

3. A camera according to claim 1, in which said means (10, 17) for stopping said film advancing mechanism comprises a film gripper (10) and a slidable plate (17) which in relation to their position to each other alternately permit and prevent the entrance of the film gripper (10) into the perforations of the picture film.

4. A camera according to claim 1, in which said means (10, 17) for stopping said film advancing mechanism comprises a film gripper (10) and a slidable plate (17) which in relation to their position to each other alternately permit and prevent the entrance of said film gripper into the perforations of the picture film, an electric switch (27), said slide plate in the position in which it prevents the gripper from engaging the perforations of the film engaging and closing said electric switch, whereby an impulse recording head (32) in said device for recording a pilot sound track is activated, said impulse recording head additionally recording the impulses on a second track (47) of said sound carrier.

5. A camera according to claim 1, in which said means (10, 17) for stopping said film advancing mechanism comprises a film gripper (10) and a slidable plate (17) which in relation to their position to each other alternately permit and prevent the entrance of said film gripper into the perforations of the picture film, said means (10, 17) for stopping said film advancing mechanism being coupled with a shutter disk which covers the picture window (3) of the camera as long as the picture film is stopped, while the synchro-impulse transmitter keeps operating.

References Cited

UNITED STATES PATENTS

| | | | |
|---|---|---|---|
| 2,822,722 | 2/1958 | Kennedy ____________ | 352—17 |
| 3,261,654 | 7/1966 | Faber et al. ________ | 352—173 |
| 3,439,598 | 4/1969 | Weitzner et al. ________ | 95—12 |

NORTON ANSHER, Primary Examiner

M. D. HARRIS, Assistant Examiner

U.S. Cl. X.R.

352—92